United States Patent
Pundak (10) Patent No.: US 11,579,679 B2
(45) Date of Patent: Feb. 14, 2023

(54) DETERMINING OPENING/CLOSING OF COMPUTING DEVICE

(71) Applicant: Microsoft Technology Licensing, LLC, Redmond, WA (US)

(72) Inventor: Gilad Pundak, Rehovot (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/318,924

(22) Filed: May 12, 2021

(65) Prior Publication Data
US 2022/0365585 A1 Nov. 17, 2022

(51) Int. Cl.
G06F 1/16 (2006.01)
G06F 1/3234 (2019.01)
G06F 1/3296 (2019.01)
G06F 1/3231 (2019.01)

(52) U.S. Cl.
CPC ............ G06F 1/3262 (2013.01); G06F 1/169 (2013.01); G06F 1/1618 (2013.01); G06F 1/3231 (2013.01); G06F 1/3296 (2013.01)

(58) Field of Classification Search
CPC ....... G06F 1/3262; G06F 1/169; G06F 1/3296
See application file for complete search history.

(56) References Cited

U.S. PATENT DOCUMENTS 5,793,358 A * 8/1998 Petkovic .............. G06F 1/1677
 345/170
7,319,890 B2 1/2008 Fan et al.
7,427,140 B1 * 9/2008 Ma .................... G06F 1/1639
 359/603
8,321,709 B2 11/2012 Jin et al.
(Continued)

FOREIGN PATENT DOCUMENTS

| CN | 110263509 A | 9/2019 |
|---|---|---|
| CN | 111052034 A | 4/2020 |
| CN | 111142618 A | 5/2020 |

OTHER PUBLICATIONS

"Apple's 'First Foldable IPhone' May Have This Samsung Component", Retrieved from: https://timesofindia.indiatimes.com/gadgets-news/apple-may-launch-its-first-foldable-iphone-with-samsung-screen-in-2022-report/articleshow/79261473.cms, Nov. 17, 2020, 11 Pages.

(Continued)

Primary Examiner — Mohammed H Rehman
(74) Attorney, Agent, or Firm — Alleman Hall Creasman & Tuttle LLP (57) ABSTRACT

Computing devices and methods for determining opening and closing of touch sensitive interfaces are disclosed. In one example, a computing device comprises a touch screen display on a first substrate that is rotatably coupled to a second substrate that includes a trackpad. A trackpad identification signal transmitted by the trackpad is received at the touch screen display, and a touch screen identification signal transmitted by the touch screen is received at the trackpad. If the trackpad identification signal matches a trackpad identification key and the touch screen identification signal matches a touch screen identification key, then an energy level of one or both signals is compared to an energy level threshold. Based at least in part on the comparison of the energy level to the threshold, a power state transition is initiated.

20 Claims, 8 Drawing Sheets

(56) References Cited

U.S. PATENT DOCUMENTS

| | | | |
|---|---|---|---|
| 9,007,306 B2 | 4/2015 | Liu | |
| 9,679,128 B1* | 6/2017 | Leung | G06F 21/32 |
| 10,038,466 B2* | 7/2018 | Park | H04B 5/0037 |
| 10,712,862 B1 | 7/2020 | Kang et al. | |
| 10,908,738 B2* | 2/2021 | Kim | G06F 1/1643 |
| 2009/0016003 A1 | 1/2009 | Ligtenberg et al. | |
| 2009/0058429 A1 | 3/2009 | Harris et al. | |
| 2013/0100160 A1 | 4/2013 | Chang | |
| 2014/0152598 A1 | 6/2014 | Tu et al. | |
| 2015/0248207 A1* | 9/2015 | Dorfner | G06F 3/0488 |
| | | | 345/174 |
| 2018/0088633 A1* | 3/2018 | Whitman | G06F 1/1677 |
| 2018/0176347 A1 | 6/2018 | Jeon et al. | |
| 2018/0260346 A1* | 9/2018 | Oh | G06F 1/1641 |
| 2019/0042042 A1* | 2/2019 | Hei | G06F 3/0445 |
| 2020/0194904 A1 | 6/2020 | Huh et al. | |
| 2021/0132730 A1 | 5/2021 | Huang et al. | |

OTHER PUBLICATIONS

"International Search Report and Written Opinion Issued in PCT Application No. PCT/US22/024152", dated Jul. 20, 2022, 14 Pages.

* cited by examiner

DETERMINING OPENING/CLOSING OF COMPUTING DEVICE

BACKGROUND

Some computing devices include two or more surfaces that have touch sensitive interfaces for receiving user inputs. When two surfaces are rotatably coupled, it may be desirable to power down the device when the surfaces are rotated closed and power up the device when they are opened. Determining when the surfaces are being closed and opened can present challenges.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed relating to a methods and computing devices for determining the opening and closing of a touch screen display relative to a trackpad. In some examples, a computing device comprises a touch screen display on a first substrate that is rotatably coupled to a second substrate comprising a trackpad. The computing device includes a processor and a memory storing instructions executable by the processor to receive from the touch screen display a trackpad identification signal transmitted by the trackpad, and receive from the trackpad a touch screen identification signal transmitted by the touch screen display. The trackpad identification signal is compared to a trackpad identification key, and the touch screen identification signal is compared to a touch screen identification key. On condition that the trackpad identification signal matches the trackpad identification key and the touch screen identification signal matches the touch screen identification key, at least a trackpad energy level of the trackpad identification signal is compared to a trackpad energy level threshold. Based at least in part on the comparison of the trackpad energy level of the trackpad identification signal to the trackpad energy level threshold, a power state transition is initiated in the computing device.

DETAILED DESCRIPTION

Many computing devices utilize multiple touch sensitive interfaces for receiving user inputs. Examples include laptop computers that comprise a touch screen display and a trackpad, foldable devices that include two rotatably-coupled touch screen displays, and other devices. In these devices, when the surfaces of two touch sensitive interfaces are closed together, the devices may be transitioned into a lower power state, such as a sleep mode. Similarly, when a user opens the surfaces from the closed configuration, the device may be transitioned from a lower power state into an active power state (e.g., normal operating condition).

To determine when surfaces are being closed and opened, some devices utilize dedicated transmitters and/or sensors, such as one or more Hall effect sensors, to detect opening/closing of the surfaces. However, because the accuracy and quality of sensors can vary, in some devices a sensor can fail to detect the opening and/or closing of two touch sensitive interfaces. In these cases, for example, when a user closes a device and expects it to enter a sleep mode, the device can remain in its normal operating power state until its battery is fully discharged. In other examples, faulty sensor(s) can fail to detect the opening of a device and correspondingly fail to wake up the device, causing user frustration. Additionally, adding one or more dedicated transmitters and/or sensors to detect opening/closing increases the costs of a device and occupies valuable device real estate.

Additionally and in many devices, inputs from two different touch sensitive interfaces are processed at an abstraction layer such as an application layer. Processing this data in an application layer introduces latencies that can delay system calculations and response times, with such inefficiencies preventing the effective utilization of data from different touch subsystems.

Accordingly, and as described in more detail below, configurations of the present disclosure provide reliable detection of the opening and closing of two touch sensitive interfaces by utilizing signals generated by the two interfaces, thereby eliminating the need for separate, dedicated sensors and saving material costs, device real estate, and system complexity. Additionally, a single processor may process these signals at a low-level layer, thereby enabling the synchronization of touch detection signals with opening/closing identification signals as well as very fast calculations.

In some examples and as described in more detail below, a computing device includes touch sensitive interfaces in the forms of a touch screen display on a first substrate that is rotatably coupled to a second substrate that includes a trackpad. The touch screen display transmits a unique touch screen identification signal that is received by the trackpad. Similarly, the trackpad transmits a unique trackpad identification signal that is received by the touch screen. If the trackpad identification signal matches a trackpad identification key and the touch screen identification signal matches a touch screen identification key, the energy level of one or both signals is compared to an energy level threshold. Based at least in part on the comparison, a power state transition is initiated in the device. Examples and use cases of the present disclosure are provided and described further below.

Figure 1:
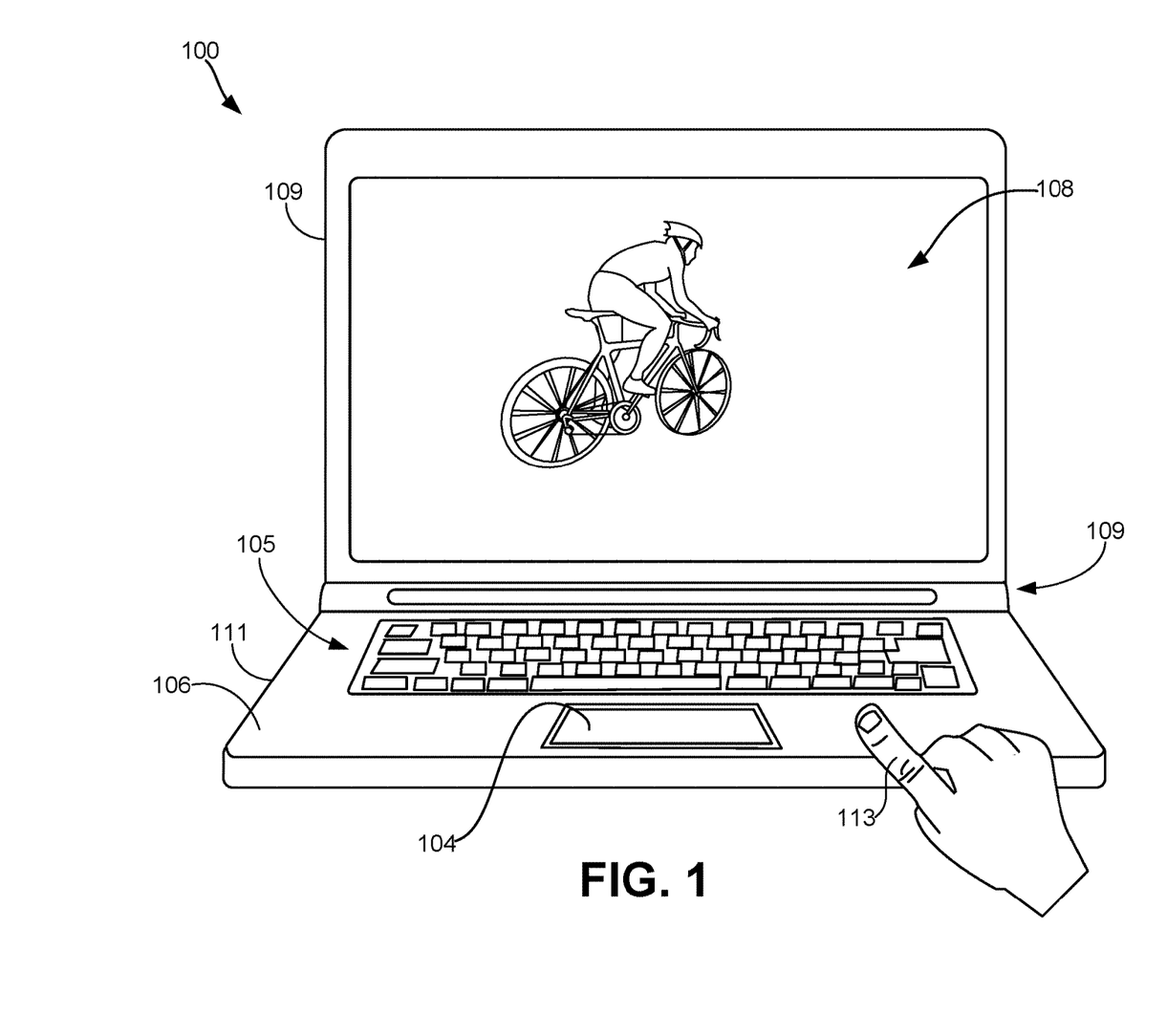
FIG. 1 shows one example of a computing device according to examples of the present disclosure.
Figure 2:
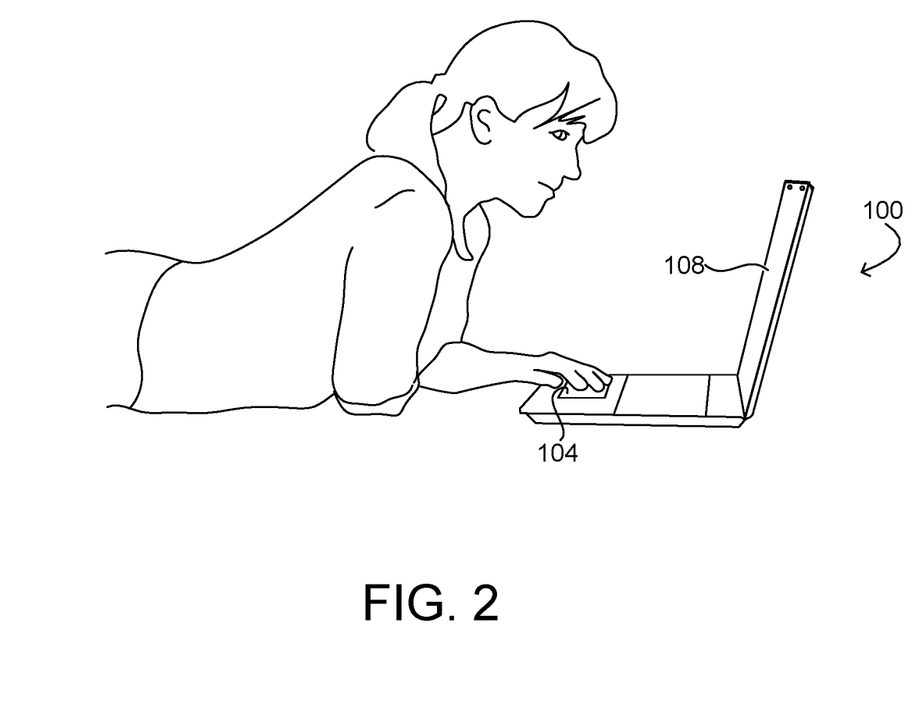
FIG. 2 shows a user interacting with the computing device of FIG. 1
Figure 3:
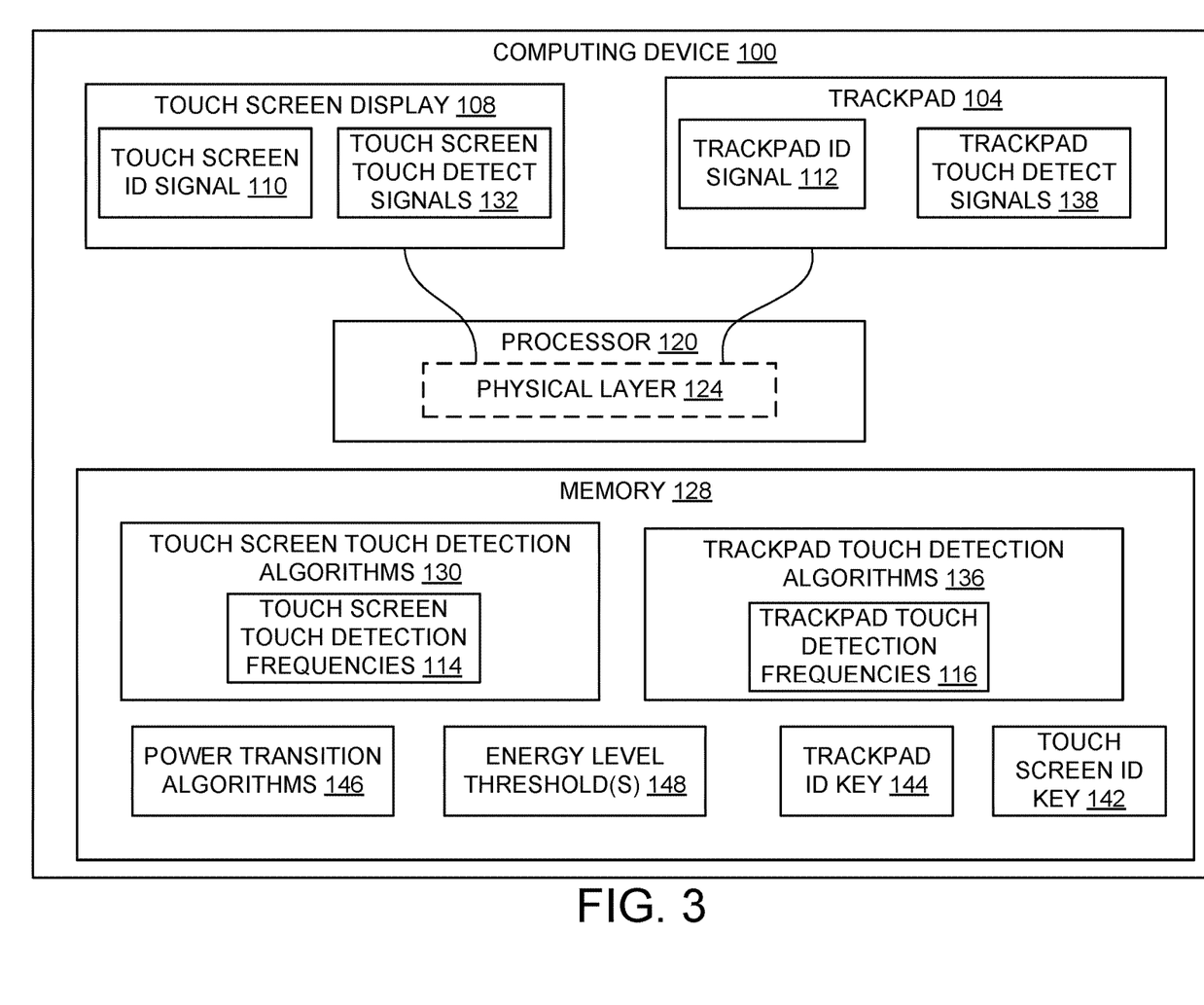
FIG. 3 shows a schematic view of components of the computing device of FIG. 1 including a touch screen display and trackpad according to examples of the present disclosure.

With reference now to FIGS. 1-3, an example computing device 100 in the form of a laptop computer is illustrated. In other examples, aspects of the present disclosure can be implemented in tablet computing devices, foldable computing devices including multiple touch screens, mobile computing devices, and any other type of computing device that utilizes multiple touch sensitive interfaces.

Computing device 100 includes a touch screen display 108 on a first substrate 109 that is rotatably coupled at a hinge 109 to a second substrate 111 that includes a trackpad/keyboard surface 106 comprising a trackpad 104 and keyboard 105. In different examples a user provides user inputs to the trackpad 104 by touching the trackpad with one or more digits 113 of the user's hand. Similarly, a user provides user inputs via the touch screen display 108 by touching or placing near the display one or more digits 113 of the user's hand and/or an input device, such as a stylus.

In some examples, the touch screen display 108 is a mutual capacitance touch screen display. In these examples, touch inputs are identified by sampling capacitance between a driving electrode and a sensing electrode. Driving electrodes are arranged in an array within the touch screen display. Touch detection signals are provided to each of the electrodes at a different frequency and/or at a different time. Conductive materials, such as a user's finger, draw current away from the driving electrodes when providing a touch input. The touch input can be identified by detecting this current, and a location of the touch input can be reconstructed based at least in part on determining which driving electrodes were being driven when the touch input occurred, and the frequency of the touch detection signal driving each driving electrode.

Detecting this current also includes detecting the current flow into various sensing electrodes that results from the increased capacitive coupling between the driving electrodes and the sensing electrodes caused by the finger or other conductive object providing the touch input. In other examples, the principles of the present disclosure may be utilized with touch screen displays employing other touch detection technologies, including but not limited to self-capacitance and projected capacitance touch detection.

Trackpad 104 is configured to detect the position and movement of a user's finger(s) and/or thumb and translate such position/movement to a relative position on the touch screen display 108. In some examples and similar to the touch screen display 108, trackpad 104 can utilize a capacitive sensing subsystem having a plurality of driving electrodes and a plurality of intersecting sensing electrodes that form sensing nodes. The presence of a finger on or near the trackpad 104 is detected by measuring changes to capacitance at the sensing node(s) that are touched or near the object. In other examples, trackpad 104 can utilize other touch sensing technologies, including but not limited to self-capacitance and projected capacitance touch detection.

As noted above, in many devices inputs from a touch screen display and a trackpad are processed at an abstraction layer such as an operating system layer. The latencies introduced by processing this data from the two touch input subsystems can inhibit effective utilization of this data. In the present examples and with reference to FIG. 3, and in one potential advantage of the present disclosure, computing device 100 utilizes a processor 120 that receives input signals from both the trackpad 104 and touch screen display 108 via a physical layer 124. In this manner, data from both the trackpad 104 and touch screen display 108 can be processed much more quickly at this fundamental layer as compared to the data translation, coordination and other transformations needed for processing data received at an abstraction layer.

Computing device 100 includes memory 128 that stores instructions executable by the processor 120. For example, and as described in more detail below, the memory 128 stores instructions executable by the processor 120 to determine opening and closing of the touch screen display 108 relative to the trackpad 104, as well as performing touch detection on the trackpad 104 and the touch screen display 108, using signals received via the physical layer 124.

In some examples the processor 120 is an ASIC that connects to physical channels in trackpad and touch screen display subsystems, and therefore enables operations to be performed on data from both subsystems much faster as compared to similar operations performed at an abstraction layer. Further and as described in more detail below, this configuration enables the synchronization of touch detection signals with opening/closing identification signals to avoid crosstalk and other interference.

As shown in FIG. 3, memory 128 includes touch screen touch detection algorithms 130 that are utilized to analyze and process touch screen touch detection signals 132 received from the touch screen display 108. Similarly, memory 128 includes trackpad touch detection algorithms 136 that are utilized to analyze and process trackpad touch detection signals 138 received from the trackpad 104.

As noted above, devices that utilize dedicated transmitters and/or sensors to detect when surfaces are being closed and opened suffer from several drawbacks. Because the accuracy and quality of sensors can vary, a sensor can fail to reliably detect an opening and/or closing of two interfaces. In some cases, a closed device can remain in a full operating mode and drain its battery. Such dedicated transmitters and/or sensors also increase the cost and complexity of a device and occupy valuable device real estate.

Accordingly, as described in more detail below and in one potential advantage of the present disclosure, configurations are disclosed in which identification signals transmitted by first and second touch sensitive interfaces are utilized to reliably detect the opening and closing of the interfaces. These configurations enable detection of the opening and closing of two touch sensitive interfaces without the use of separate, dedicated sensors, thereby reducing material costs, complexity, and device real estate requirements. Additionally, a single processor may process these signals at a low-level layer, thereby enabling the synchronization of touch detection signals with opening/closing identification signals as well as very fast calculations.

Figure 4A:
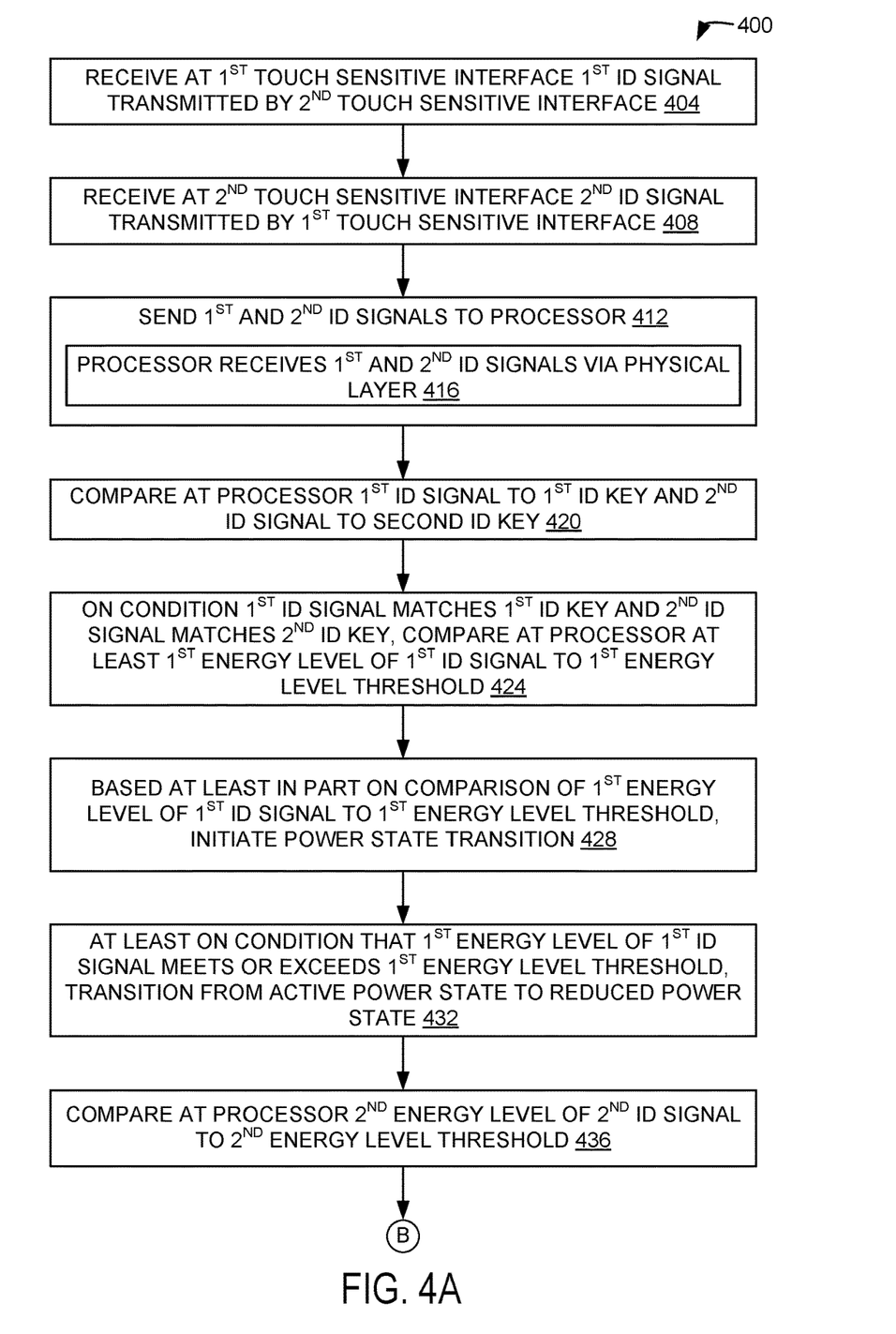
FIGS. 4A, 4B, and 4C show a flow diagram of an example method for determining opening and closing of a first touch sensitive interface relative to a second touch sensitive interface according to examples of the present disclosure.
Figure 4B:
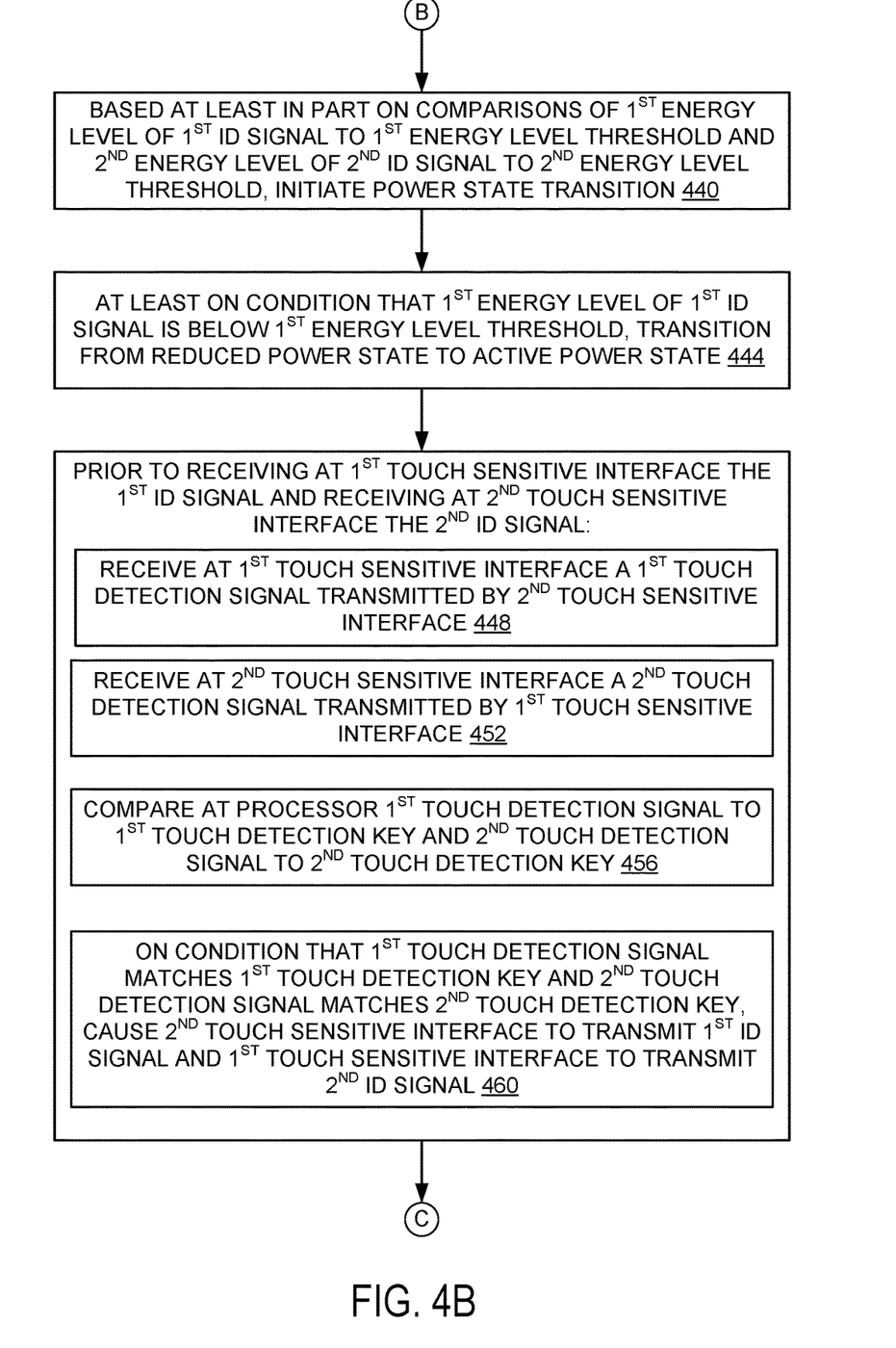
Figure 4C:
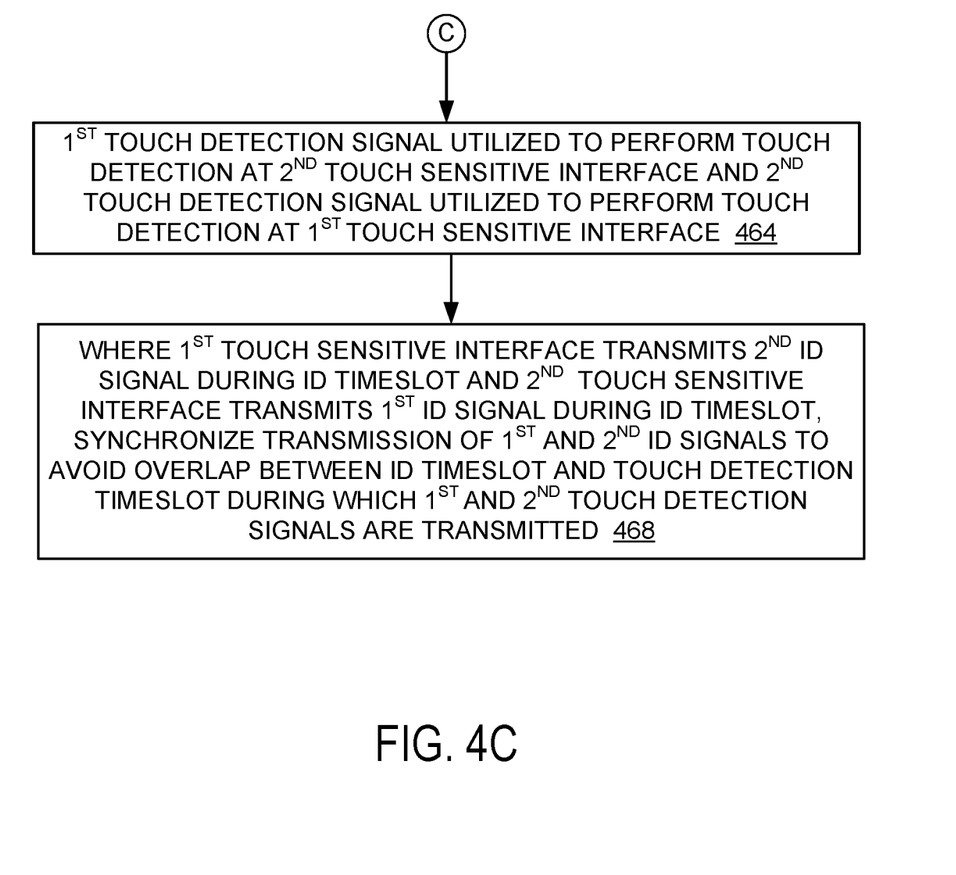
Figure 5:
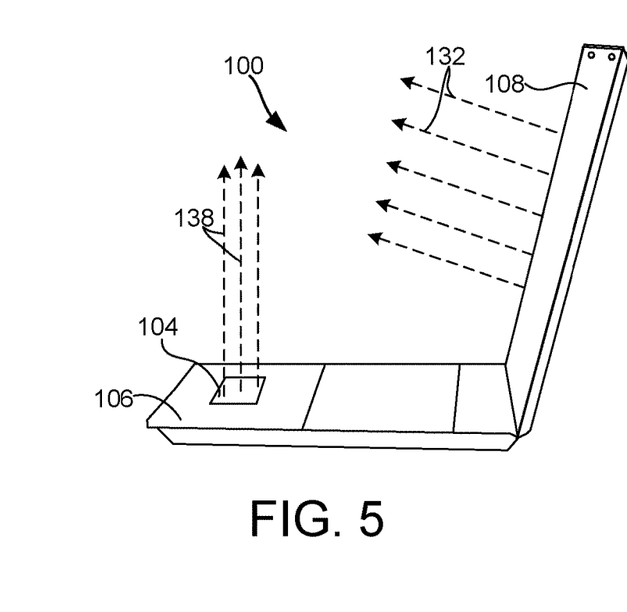
FIGS. 5-7 show the touch screen display and trackpad of the computing device of FIG. 1 rotated relative to one another according to examples of the present disclosure.

With reference now to FIGS. 4A-4C and 5-9, a method 400 for determining opening and closing of a first touch sensitive interface relative to a second touch sensitive interface will now be described. FIGS. 4A-4C depict a flowchart illustrating the method 400. As described in more detail below, in some examples method 400 may be implemented and performed at computing device 100.

The following description of method 400 is provided by way of example and is not meant to be limiting. Therefore, it is to be understood that method 400 may include additional and/or alternative steps relative to those illustrated in FIGS. 4A-4C. Further, it is to be understood that the steps of method 400 may be performed in any suitable order. Further still, it is to be understood that one or more steps may be omitted from method 400 without departing from the scope of this disclosure. It will also be appreciated that method 400 also may be performed in other contexts using other suitable components.

With reference to FIG. 4A, at 404 the method 400 includes receiving at the first touch sensitive interface a first identification signal that is transmitted by the second touch sensitive interface. In some examples and with reference to FIGS. 6-7, the touch screen display 108 may transmit a touch screen identification signal 110 that is received by the trackpad 104 when the touch screen display is angled toward the trackpad. The touch screen identification signal 110 may be generated by the driving electrodes of the touch screen display 108.

With reference again to FIG. 4A and in a similar manner, at 408 the method 400 includes receiving at the second touch sensitive interface a second identification signal that is transmitted by the first touch sensitive interface. In some examples and with reference again to FIGS. 6-7, the trackpad 104 may transmit a trackpad identification signal 112 that is received by the touch screen display 108 when the touch screen display is angled toward the trackpad. The trackpad identification signal 112 may be generated by driving electrodes of the trackpad 104.

In different examples the touch screen identification signal 110 and trackpad identification signal 112 may take the form of a digital or analog protocol. In some examples, a digital protocol may utilize a data modulation scheme in which a set of frequencies is used to transmit binary information. In these examples, the touch screen identification signal 110 corresponds to a digital key that identifies the touch screen display 108 as the source of the signal. Similarly, the trackpad identification signal 112 corresponds to a digital key that identifies the trackpad 104 as the source of the signal. Any suitable data modulation scheme may be utilized, including but not limited to binary frequency-shift keying (BFSK) and phase-shift keying (PSK).

In other examples, the touch screen identification signal 110 and trackpad identification signal 112 may take the form of an analog protocol. In some examples, an analog protocol may utilize a discrete identification frequency for the touch screen display 108 and another discrete identification frequency for the trackpad 104. In these examples, the touch screen identification signal 110 and trackpad identification signal 112 may be selected to be spaced from the touch screen touch detection frequencies 114 utilized by touch screen display 108 for touch detection and the trackpad touch detection frequencies 116 utilized by the trackpad 104 for touch detection.

In one exemplary use case, trackpad 104 is configured to detect user touch inputs by providing signals to driving electrodes in a selected trackpad touch detection frequency range, such as 300 kHz-450 kHz. Similarly, touch screen display 108 is configured to detect user touch inputs by providing signals to driving electrodes in a different selected touch screen touch detection frequency range, such as 50-200 kHz. In this example, the touch screen identification signal 110 is selected as 225 kHz and trackpad identification signal 112 is selected as 275 kHz. In other example use cases, other frequency ranges and identification signal frequencies may be utilized.

With reference again to FIG. 4A, at 412 the method 400 includes sending the first identification signal and second identification signal to the processor 120. As noted above, and in one potential advantage of the present disclosure, at 416 the processor receives the first identification signal and second identification signal via a physical layer 124. As described in more detail below, receiving data at a physical layer enables the processor 120 to synchronize the timeslots during which touch screen identification signals 110 and trackpad identification signals 112 are sent with timeslots utilized for touch screen touch detection signals 132 and trackpad touch detection signals 138.

At 420 the method 400 includes comparing at the processor the first identification signal to a first identification key and the second identification signal to a second identification key. As noted above and in some examples utilizing a digital protocol, the touch screen identification signal 110 takes the form of a digital key that identifies the touch screen display 108 as the source of the signal. In these examples, the processor 120 compares the touch screen identification signal 110 to a stored touch screen identification key 142 in the form of a digital key. Similarly, the processor 120 compares the trackpad identification signal 112 to a stored trackpad identification key 144 in the form of a digital key.

In other examples utilizing an analog protocol, the touch screen identification signal 110 takes the form of a deterministic analog signal key, such as a particular frequency as described above, that identifies the touch screen display 108 as the source of the signal. In these examples, the processor 120 compares the touch screen signal frequency to a stored touch screen identification key 142 in the form of a particular frequency. Similarly, the processor 120 compares the trackpad signal frequency to a stored trackpad identification key 144 in the form of a different frequency. For example, and with reference again to FIG. 3, one or more power transition algorithms 146 may be executed to perform these comparisons.

At 424 the method 400 includes, on condition that the first identification signal matches the first identification key and the second identification signal matches the second identification key, comparing at the processor at least a first energy level of the first identification signal to a first energy level threshold. At 428 the method 400 includes, based at least in part on the comparison of the first energy level of the first identification signal to the first energy level threshold, initiating a power state transition in the computing device.

In some examples, when utilizing a digital protocol, the power transition algorithms 146 determine (1) whether the touch screen identification signal 110 in the form of a digital key matches the touch screen identification key 142, and (2) whether the trackpad identification signal 112 matches the trackpad identification key 144. By requiring that the identification signals transmitted from both the touch screen display 108 and the trackpad 104 match corresponding identification keys, and in one potential advantage of the present disclosure as discussed below, the present configurations provide greater reliability in detecting when the computing device 100 is being opened or closed.

Figure 6:
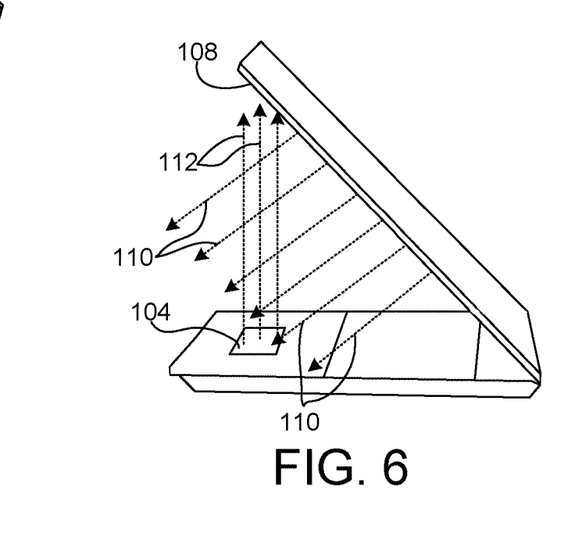

With reference again to FIG. 6, in some examples a user may partially rotate the touch screen display 108 towards the trackpad 104 and leave the device in this orientation without fully closing the device. In these examples, the user likely intends for the device to remain fully operational and does not intend to power down or put the device into a sleep mode. As shown in FIG. 6, in these examples and at some angles, touch screen identification signals 110 may be received by the trackpad 104 and trackpad identification signals 112 may be received by the touch screen display 108.

Accordingly and as noted above, before initiating a power state transition in the computing device 100, and on condition that the first identification signal matches the first identification key and the second identification signal matches the second identification key, the power transition algorithms 146 analyze the energy level of the touch screen identification signals 110 and/or the trackpad identification signals 112, and compare such level(s) to an energy level threshold(s) 148 to determine whether to initiate a power state transition.

In one example, the power transition algorithms 146 may detect a user closing the computing device by monitoring the energy levels of the touch screen identification signals 110 received at trackpad 104 and/or energy levels of the trackpad identification signals 112 received at touch screen display 108, and comparing such level(s) to a corresponding energy level threshold(s) 148. For example, with reference again to FIG. 4A, at 432 the method 400 includes, at least on condition that the first energy level of the first identification signal meets or exceeds the first energy level threshold, transitioning from an active power state to a reduced power state.

Figure 7:
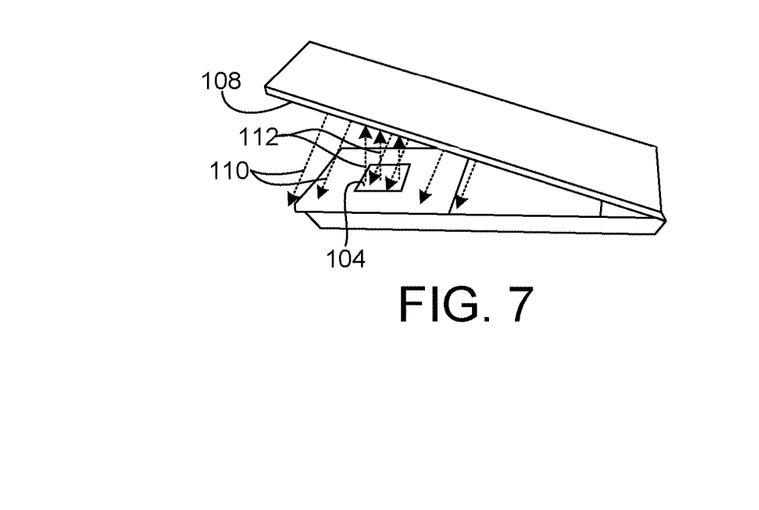
Figure 8:
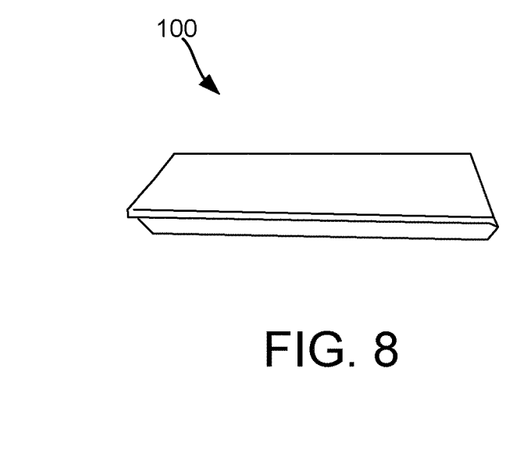
FIG. 8 shows the computing device of FIG. 1 in a closed configuration.

In one example and as shown in FIGS. 5-8, as the touch screen display 108 is rotated to the closed configuration in FIG. 8, the display moves increasingly closer to the trackpad 104. Correspondingly, the energy levels of the touch screen identification signals 110 received at the trackpad 104 increase and the energy levels of the trackpad identification signals 112 received at the touch screen display 108 also increase as the touch screen display 108 moves closer to the trackpad 104. Accordingly, power transition algorithms 146 may utilize energy level threshold(s) 148 that correspond to a relatively small distance between the touch screen display 108 and trackpad 104, to thereby provide a high likelihood that the user is closing the computing device 100.

In one example, an energy level threshold 148 that corresponds to an angle of approximately 5 degrees between the touch screen display 108 and trackpad 104 may be selected and utilized for the touch screen identification signals 110. As the touch screen display 108 is rotated and moves increasingly closer to the trackpad 104, the energy level of the touch screen identification signals 110 received at the trackpad 104 correspondingly increases. These energy levels may be sampled and compared with the energy level threshold 148 at any suitable sampling frequency. When the energy level of the touch screen identification signals 110 meets or exceeds the selected energy level threshold 148, the power transition algorithms transition the computing device 100 from an active power state to a reduced power state, such as a sleep mode.

In other examples, other energy level thresholds 148 that correspond to other desired distances between the touch screen display 108 and trackpad 104 may be selected and utilized. In some examples, an energy level threshold 148 that corresponds to the touch screen display being completely closed as shown in FIG. 8 may be utilized.

In other examples, the power transition algorithms 146 may detect a user closing the computing device by monitoring the energy levels of the trackpad identification signals 112, and comparing such level(s) to a corresponding energy level threshold(s) 148 in the same manner as described above for the touch screen identification signals 110.

In other examples, the power transition algorithms 146 may monitor the energy levels of both the touch screen identification signals 110 and the trackpad identification signals 112, and compare those levels to corresponding energy level threshold(s), to detect a user closing the computing device 100. In this manner, and in one potential advantage of the present disclosure, utilizing both energy levels to determine that the user is closing the computing device 100 may provide greater accuracy and a corresponding higher confidence of an accurate result. Accordingly, and with reference again to FIG. 4A, at 436 the method 400 may include comparing at the processor a second energy level of the second identification signal to a second energy level threshold. In different examples, the second energy level threshold may be the same threshold or a different threshold than the first energy level threshold. With reference now to FIG. 4B, at 440 the method 400 may include, based at least in part on the comparisons of both the first energy level of the first identification signal to the first energy level threshold and the second energy level of the second identification signal to the second energy level threshold, initiating the power state transition in the computing device.

In a manner similar to determining the closing of the computing device 100, in some examples the power transition algorithms 146 may monitor the energy levels of the touch screen identification signals 110 and/or the trackpad identification signals 112 to detect a user opening the computing device 100. More particularly and as shown in FIG. 8, when the computing device 100 is closed and in a reduced power state, such as a sleep or idle mode, the touch screen display 108 is directly adjacent to the trackpad 104. Accordingly, the energy levels of touch screen identification signals 110 received by the trackpad 104 and trackpad identification signals 112 received by the touch screen display 108 are relatively high. When a user opens and begins rotating the touch screen display 108 away from the trackpad 104, the energy levels of the identification signals will correspondingly decrease. Thus, and similar to the examples described above, the power transition algorithms 146 may monitor the energy level of the touch screen identification signals 110 and/or the trackpad identification signals 112, and compare such level(s) to an energy level threshold(s) 148 to determine whether to initiate a different power state transition, namely, transitioning from a reduced power state to an active power state.

Accordingly, and with reference again to FIG. 4B, at 444 the method 400 may include, at least on condition that the first energy level of the first identification signal is below the first energy level threshold, transitioning from a reduced power state to an active power state. For example, as the touch screen display 108 is opened and moves further away from the trackpad 104, the energy level of the touch screen identification signals 110 received at the trackpad 104 correspondingly decreases. These energy levels may be sampled and compared with an energy level threshold 148 at any suitable sampling frequency. When the energy level of the touch screen identification signals 110 falls below the selected energy level threshold 148, the power transition algorithms transition the computing device 100 from the reduced power state to the active power state.

As with the other examples discussed above, any suitable energy level thresholds 148 that correspond to a desired distance between the touch screen display 108 and trackpad 104 may be selected and utilized to detect opening of the computing device 100. In other examples, the power transition algorithms 146 may detect a user opening the computing device by monitoring the energy levels of the trackpad identification signals 112, and comparing such level(s) to a corresponding energy level threshold(s) 148 in the same manner as described above for the touch screen identification signals 110.

In other examples, the power transition algorithms 146 may monitor the energy levels of both the touch screen identification signals 110 and the trackpad identification signals 112, and compare them to corresponding energy level threshold(s) as discussed above, to detect a user opening the computing device 100. In this manner, and as noted above, utilizing both energy levels to determine that the user is opening the computing device 100 may provide greater accuracy and a higher confidence of an accurate result.

In some examples, the computing device 100 may utilize one or more triggers indicating a potential closing action to cause the touch screen display 108 to begin transmitting the touch screen identification signals 110 and/or the trackpad 104 to begin transmitting the trackpad identification signals 112. Advantageously, and as described in more detail below, these configurations can reduce power consumption by refraining from transmitting the identification signals until such a trigger(s) is detected.

With reference again to FIG. 4B, at 448 the method 400 may include, prior to receiving the first identification signal at the first touch sensitive interface and receiving the second identification signal at the second touch sensitive interface, receiving at the first touch sensitive interface a first touch detection signal that is transmitted by the second touch sensitive interface, and at 452 receiving at the second touch sensitive interface a second touch detection signal that is transmitted by the first touch sensitive interface. In some examples, the first touch detection signal can be the touch screen touch detection signals 132 that are analyzed and processed by the touch screen touch detection algorithms 130. Similarly, the second touch detection signal can be the trackpad touch detection signals 138 that are analyzed and processed by the trackpad touch detection algorithms 136.

For example and with reference again to FIG. 5, when the computing device 100 is being used in a typical operating configuration with the touch screen display 108 forming an angle with the trackpad/keyboard surface 106 of 90 degrees or greater, the touch screen touch detection signals 132 may not impinge upon the trackpad 104, and the trackpad touch detection signals 138 may not impinge upon the touch screen display 108. In this configuration, the computing device performs standard touch detection activities on the touch screen display 108 and trackpad 104. Additionally, and to conserve battery resources, in this configuration the touch screen 108 does not transmit touch screen identification signals 110 and the trackpad 104 does not transmit the trackpad identification signals 112

As shown in FIGS. 6-8, as a user closes the touch screen display 108 the touch screen touch detection signals 132 begin impinging upon the trackpad 104 and the trackpad touch detection signals 138 begin impinging upon the touch screen display 108. Accordingly and as described below, the computing device 100 may utilize the receipt of the touch screen touch detection signals 132 at the trackpad 104 and the receipt of the trackpad touch detection signals 138 at the touch screen display 108 to determine that the user may be closing the computing device, and to correspondingly trigger the transmission of the touch screen identification signals 110 and/or the trackpad identification signals 112.

In this manner and with reference again to FIG. 4B, at 456, after receiving at the first touch sensitive interface the first touch detection signal transmitted by the second touch sensitive interface, and receiving at the second touch sensitive interface the second touch detection signal transmitted by the first touch sensitive interface, the method 400 may include comparing at the processor the first touch detection signal to a first touch detection key and the second touch detection signal to a second touch detection key. Next and at 460 the method 400 may include, on condition that the first touch detection signal matches the first touch detection key and the second touch detection signal matches the second touch detection key, causing the second touch sensitive interface to transmit the first identification signal and the first touch sensitive interface to transmit the second identification signal.

In the present example and as noted above with respect to FIG. 5, as the touch screen display 108 is rotated from an operating configuration toward the trackpad 104, during the rotation the trackpad begins receiving touch screen touch detection signals 132 and transmits these signals to processor 120, and the touch screen display 108 begins receiving trackpad touch detection signals 138 and transmits these signals to the processor. The power transition algorithms 146 may then verify that the touch screen touch detection signals 132 received from the trackpad 104 match the touch screen touch detection frequencies 114, and the trackpad touch detection signals 138 received from the touch screen display 108 match the trackpad touch detection frequencies 116. As noted above, on condition that the touch screen touch detection signals 132 match the touch screen touch detection frequencies 114 and the trackpad touch detection signals 138 match the trackpad touch detection frequencies 116, the power transition algorithms 146 cause the trackpad to begin transmitting the trackpad identification signal 112 and the touch screen display 108 to begin transmitting the touch screen identification signal 110.

In these examples, and in one potential advantage of the present disclosure, the same touch detection signals utilized by the touch screen display 108 and the trackpad 104 are also utilized to determine that a user is closing the computing device 100 and to correspondingly trigger the transmission of the touch screen identification signals 110 and the trackpad identification signals 112. Accordingly, and with reference to FIG. 4C, at 464 the method 400 may include also utilizing the first touch detection signal to perform touch detection at the second touch sensitive interface and the second touch detection signal to perform touch detection at the first touch sensitive interface. These configurations that utilize the same signals for multiple purposes may have the technical advantage of reducing system complexity.

In some examples and as noted above, receiving data at a physical layer 124 enables the processor 120 to synchronize the timeslots during which touch screen identification signal 110 and trackpad identification signal 112 are sent with timeslots during which touch screen touch detection signals 132 and trackpad touch detection signals 138 are transmitted. Accordingly and with reference again to FIG. 4C, at 468 the method 400 includes, where the first touch sensitive interface transmits the second identification signal during an identification timeslot and the second touch sensitive interface transmits the first identification signal also during the identification timeslot, synchronizing transmission of the first identification signal and the second identification signal to avoid overlap between the identification timeslot and a touch detection timeslot during which the first touch detection signal and the second touch detection signal are transmitted. Accordingly, and in one potential advantage of the present disclosure, by synchronizing these timeslots in this manner, the computing device 100 can utilize signals from the touch screen display 108 and trackpad 104 to perform touch detection while also monitoring for closing of the device.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
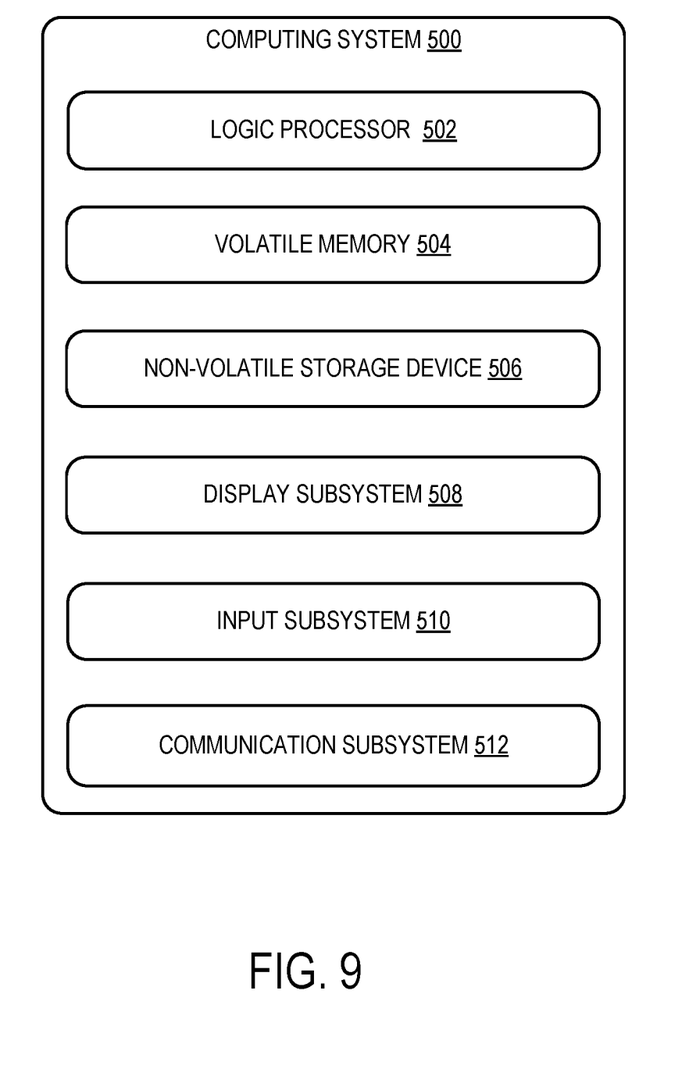
FIG. 9 shows a block diagram of an example computing system according to examples of the present disclosure.

FIG. 9 schematically shows a non-limiting embodiment of a computing system 500 that can enact one or more of the methods and processes described above. Computing system 500 is shown in simplified form. Computing system 500 may take the form of one or more personal computers, server computers, tablet computers, home-entertainment computers, gaming devices, mobile computing devices, mobile communication devices (e.g., smart phone), wearable computing devices, and/or other computing devices. The laptop computing device 100 described above may comprise computing system 500 or one or more aspects of computing system 500.

Computing system 500 includes a logic processor 502, volatile memory 504, and a non-volatile storage device 506. Computing system 500 may optionally include a display sub system 508, input sub system 510, communication sub system 512, and/or other components not shown in FIG. 5.

Logic processor 502 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 502 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Volatile memory 504 may include physical devices that include random access memory (RAM). Volatile memory 504 is typically utilized by logic processor 502 to temporarily store information during processing of software instructions. It will be appreciated that volatile memory 504 typically does not continue to store instructions when power is cut to the volatile memory 504.

Non-volatile storage device 506 includes one or more physical devices configured to hold instructions executable by the logic processors to implement the methods and processes described herein. When such methods and processes are implemented, the state of non-volatile storage device 506 may be transformed—e.g., to hold different data.

Non-volatile storage device 506 may include physical devices that are removable and/or built-in. Non-volatile storage device 506 may include optical memory (e.g., CD, DVD, HD-DVD, Blu-Ray Disc, etc.), semiconductor memory (e.g., ROM, EPROM, EEPROM, FLASH memory, etc.), magnetic memory (e.g., hard-disk drive, floppy-disk drive, tape drive, MRAM, etc.), and/or other mass storage device technology. Non-volatile storage device 506 may include nonvolatile, dynamic, static, read/write, read-only, sequential-access, location-addressable, file-addressable, and/or content-addressable devices. It will be appreciated that non-volatile storage device 506 is configured to hold instructions even when power is cut to the non-volatile storage device 506.

Aspects of logic processor 502, volatile memory 504, and non-volatile storage device 506 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 typically implemented in software by a processor to perform a particular function using portions of volatile memory, which function involves transformative processing that specially configures the processor to perform the function. Thus, a module, program, or engine may be instantiated via logic processor 502 executing instructions held by non-volatile storage device 506, using portions of volatile memory 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 508 may be used to present a visual representation of data held by non-volatile storage device 506. As the herein described methods and processes change the data held by the non-volatile storage device, and thus transform the state of the non-volatile storage device, the state of display subsystem 508 may likewise be transformed to visually represent changes in the underlying data. Display subsystem 508 may include one or more display devices utilizing virtually any type of technology. Such display devices may be combined with logic processor 502, volatile memory 504, and/or non-volatile storage device 506 in a shared enclosure, or such display devices may be peripheral display devices.

When included, input subsystem 510 may comprise or interface with one or more user-input devices such as a keyboard, mouse, touch screen, trackpad (virtual or physical), electronic pen, stylus, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 512 may be configured to communicatively couple various computing devices described herein with each other, and with other devices. Communication subsystem 512 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 500 to send and/or receive messages to and/or from other devices via a network such as the Internet.

The following paragraphs provide additional support for the claims of the subject application. One aspect provides, in a computing device comprising a processor and a first touch sensitive interface on a first substrate that is rotatably coupled to a second substrate comprising a second touch sensitive interface, a method for determining opening and closing of the first touch sensitive interface relative to the second touch sensitive interface, the method comprising: receiving at the first touch sensitive interface a first identification signal that is transmitted by the second touch sensitive interface; receiving at the second touch sensitive interface a second identification signal that is transmitted by the first touch sensitive interface; sending the first identification signal and the second identification signal to the processor; comparing at the processor the first identification signal to a first identification key and the second identification signal to a second identification key; on condition that the first identification signal matches the first identification key and the second identification signal matches the second identification key, comparing at the processor at least a first energy level of the first identification signal to a first energy level threshold; and based at least in part on the comparison of the first energy level of the first identification signal to the first energy level threshold, initiating a power state transition in the computing device. The method may additionally or alternatively include comparing at the processor a second energy level of the second identification signal to a second energy level threshold; and based at least in part on the comparisons of both the first energy level of the first identification signal to the first energy level threshold and the second energy level of the second identification signal to the second energy level threshold, initiating the power state transition in the computing device. The method may additionally or alternatively include, prior to receiving the first identification signal at the first touch sensitive interface and receiving the second identification signal at the second touch sensitive interface: receiving at the first touch sensitive interface a first touch detection signal that is transmitted by the second touch sensitive interface; receiving at the second touch sensitive interface a second touch detection signal that is transmitted by the first touch sensitive interface; comparing at the processor the first touch detection signal to a first touch detection key and the second touch detection signal to a second touch detection key; on condition that the first touch detection signal matches the first touch detection key and the second touch detection signal matches the second touch detection key, causing the second touch sensitive interface to transmit the first identification signal and the first touch sensitive interface to transmit the second identification signal.

The method may additionally or alternatively include, wherein the first touch detection signal is also utilized by the computing device to perform touch detection at the second touch sensitive interface and the second touch detection signal is also utilized by the computing device to perform touch detection at the first touch sensitive interface. The method may additionally or alternatively include, wherein the first touch sensitive interface transmits the second identification signal during an identification timeslot and the second touch sensitive interface transmits the first identification signal during the identification timeslot, the method further comprising synchronizing transmission of the first identification signal and the second identification signal to avoid overlap between the identification timeslot and a touch detection timeslot during which the first touch detection signal and the second touch detection signal are transmitted. The method may additionally or alternatively include, at least on condition that the first energy level of the first identification signal meets or exceeds the first energy level threshold, transitioning from an active power state to a reduced power state. The method may additionally or alternatively include, at least on condition that the first energy level of the first identification signal is below the first energy level threshold, transitioning from a reduced power state to an active power state. The method may additionally or alternatively include, wherein the processor receives the first identification signal and the second identification signal via a physical layer.

Another aspect provides computing device, comprising: a first substrate comprising a touch screen display; a trackpad on a second substrate rotatably coupled to the touch screen display first substrate; a processor; and a memory storing instructions executable by the processor to determine opening and closing of the touch screen display relative to the trackpad, the instructions executable to: receive from the touch screen display a trackpad identification signal transmitted by the trackpad; receive from the trackpad a touch screen identification signal transmitted by the touch screen display; compare the trackpad identification signal to a trackpad identification key and the touch screen identification signal to a touch screen identification key; on condition that the trackpad identification signal matches the trackpad identification key and the touch screen identification signal matches the touch screen identification key, compare at least a trackpad energy level of the trackpad identification signal to a trackpad energy level threshold; and based at least in part on the comparison of the trackpad energy level of the trackpad identification signal to the trackpad energy level threshold, initiate the power state transition in the computing device. The computing device may additionally or alternatively include, wherein the instructions are executable to: compare a touch screen energy level of the touch screen identification signal to a touch screen energy level threshold; and based at least in part on the comparison of both the trackpad energy level of the trackpad identification signal to the trackpad energy level threshold and the touch screen energy level of the touch screen identification signal to the touch screen energy level threshold, initiate the power state transition in the computing device. The computing device may additionally or alternatively include, wherein prior to receiving the trackpad identification signal at the touch screen display and receiving the touch screen identification signal at the trackpad, the instructions are executable to: receive from the touch screen display a trackpad touch detection signal transmitted by the trackpad; receive from the trackpad a touch screen touch detection signal transmitted by the touch screen display; compare the trackpad touch detection signal to a trackpad touch detection key and the touch screen touch detection signal to a touch screen touch detection key; and on condition that the trackpad touch detection signal matches the trackpad touch detection key and the touch screen touch detection signal matches the touch screen touch detection key, cause the trackpad to transmit the trackpad identification signal and the touch screen display to transmit the touch screen identification signal.

The computing device may additionally or alternatively include, wherein the instructions are executable to: utilize the trackpad touch detection signal to perform touch detection at the trackpad; and utilize the touch screen touch detection signal to perform touch detection at the touch screen display. The computing device may additionally or alternatively include, wherein the instructions are executable to: cause the trackpad to transmit the touch screen identification signal during an identification timeslot; cause the touch screen display to transmit the trackpad identification signal during the identification timeslot; and synchronize transmission of the trackpad identification signal and the touch screen identification signal to avoid overlap between the identification timeslot and a touch detection timeslot during which the trackpad touch detection signal and the touch screen touch detection signal are transmitted. The computing device may additionally or alternatively include, wherein the instructions are executable to, at least on condition that the trackpad energy level of the trackpad identification signal meets or exceeds the trackpad energy level threshold, transition the computing device from an active power state to a reduced power state. The computing device may additionally or alternatively include, wherein the instructions are executable to, at least on condition that the trackpad energy level of the trackpad identification signal is below the first energy level threshold, transition the computing device from a reduced power state to an active power state. The computing device may additionally or alternatively include, wherein the processor receives the trackpad identification signal and the touch screen identification signal via a physical layer.

Another aspect includes, in a computing device comprising a processor and a trackpad on a first substrate rotatably coupled to a second substrate comprising a touch screen display, a method for determining closing of the touch screen display relative to the trackpad, the method comprising: receiving at the trackpad a touch screen identification signal that is transmitted by the touch screen display; receiving at the touch screen display a trackpad identification signal that is transmitted by the trackpad; comparing at the processor the touch screen identification signal to a touch screen identification key and the trackpad identification signal to a trackpad identification key; on condition that the touch screen identification signal matches the touch screen identification key and the trackpad identification signal matches the trackpad identification key, comparing at the processor at least a first energy level of the touch screen identification signal to a touch screen energy level threshold; and on condition that the touch screen energy level of the touch screen identification signal meets or exceeds the touch screen energy level threshold, transitioning the computing device from an active power state to a reduced power state. The method may additionally or alternatively include comparing at the processor a trackpad energy level of the trackpad identification signal to a trackpad energy level threshold; and based at least in part on the comparison of both the touch screen energy level of the touch screen identification signal to the touch screen energy level threshold and the trackpad energy level of the trackpad identification signal to the trackpad energy level threshold, transitioning the computing device from the active power state to the reduced power state. The method may additionally or alternatively include, prior to receiving the touch screen identification signal at the trackpad and receiving the trackpad identification signal at the touch screen display: receiving at the trackpad a touch screen touch detection signal that is transmitted by the touch screen display; receiving at the touch screen display a trackpad touch detection signal that is transmitted by the trackpad; sending the touch screen touch detection signal and the trackpad touch detection signal to the processor; comparing at the processor the touch screen touch detection signal to a touch screen touch detection key and the trackpad touch detection signal to a trackpad touch detection key; and on condition that the touch screen touch detection signal matches the touch screen touch detection key and the trackpad touch detection signal matches the trackpad touch detection key, causing the trackpad to transmit the trackpad identification signal and the touch screen to transmit the touch screen identification signal. The method may additionally or alternatively include, wherein the trackpad touch detection signal is also utilized by the computing device to perform touch detection at the trackpad and the touch screen touch detection signal is also utilized by computing device to perform touch detection at the touch screen display.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. In a computing device comprising a processor and a first touch sensitive interface on a first substrate that is rotatably coupled to a second substrate comprising a second touch sensitive interface, a method for determining opening and closing of the first touch sensitive interface relative to the second touch sensitive interface, the method comprising:
    receiving at the first touch sensitive interface a first identification signal that is transmitted by the second touch sensitive interface, wherein the first identification signal is generated by driving electrodes of the first touch sensitive interface;
    receiving at the second touch sensitive interface a second identification signal that is transmitted by the first touch sensitive interface, wherein the second identification signal is generated by driving electrodes of the second touch sensitive interface;
    sending the first identification signal and the second identification signal to the processor;
    comparing at the processor the first identification signal to a first identification key and the second identification signal to a second identification key;
    determining at the processor that the first identification signal matches the first identification key and the second identification signal matches the second identification key; and
    based at least in part on determining that the first identification signal matches the first identification key and the second identification signal matches the second identification key, initiating a power state transition in the computing device.

2. The method of claim 1, further comprising: The method of claim 1, further comprising:
    comparing at the processor at least a first energy level of the first identification signal to a first energy level threshold; and based at least in part on the comparisons of the first energy level of the first identification signal to the first energy level threshold, initiating the power state transition in the computing device.

3. The method of claim 2, further comprising, at least on condition that the first energy level of the first identification signal meets or exceeds the first energy level threshold, transitioning from an active power state to a reduced power state.

4. The method of claim 2, further comprising, at least on condition that the first energy level of the first identification signal is below the first energy level threshold, transitioning from a reduced power state to an active power state.

5. The method of claim 1, further comprising, prior to receiving the first identification signal at the first touch sensitive interface and receiving the second identification signal at the second touch sensitive interface:
receiving at the first touch sensitive interface a first touch detection signal that is transmitted by the second touch sensitive interface;
receiving at the second touch sensitive interface a second touch detection signal that is transmitted by the first touch sensitive interface;
comparing at the processor the first touch detection signal to a first touch detection key and the second touch detection signal to a second touch detection key; and
on condition that the first touch detection signal matches the first touch detection key and the second touch detection signal matches the second touch detection key, causing the second touch sensitive interface to transmit the first identification signal and the first touch sensitive interface to transmit the second identification signal.

6. The method of claim 5, wherein the first touch detection signal is also utilized by the computing device to perform touch detection at the second touch sensitive interface and the second touch detection signal is also utilized by the computing device to perform touch detection at the first touch sensitive interface.

7. The method of claim 6, wherein the first touch sensitive interface transmits the second identification signal during an identification timeslot and the second touch sensitive interface transmits the first identification signal during the identification timeslot, the method further comprising synchronizing transmission of the first identification signal and the second identification signal to avoid overlap between the identification timeslot and a touch detection timeslot during which the first touch detection signal and the second touch detection signal are transmitted.

8. The method of claim 1, wherein the processor receives the first identification signal and the second identification signal via a physical layer.

9. A computing device, comprising:
a first substrate comprising a touch screen display;
a trackpad on a second substrate rotatably coupled to the first substrate;
a processor; and
a memory storing instructions executable by the processor to determine opening and closing of the touch screen display relative to the trackpad, the instructions executable to:
receive from the touch screen display a trackpad identification signal transmitted by the trackpad, wherein the trackpad identification signal is generated by driving electrodes of the trackpad;
receive from the trackpad a touch screen identification signal transmitted by the touch screen display, wherein the touch screen identification signal is generated by driving electrodes of the touch screen display;
compare the trackpad identification signal to a trackpad identification key and the touch screen identification signal to a touch screen identification key;
determine that the trackpad identification signal matches the trackpad identification key and the touch screen identification signal matches the touch screen identification key; and
based at least in part on determining that the trackpad identification signal matches the trackpad identification key and the touch screen identification signal matches the touch screen identification key, initiate a power state transition in the computing device.

10. The computing device of claim 9, wherein the instructions are executable to:
compare at least a trackpad energy level of the trackpad identification signal to a trackpad energy level threshold; and
based at least in part on the comparison of the trackpad energy level of the trackpad identification signal to the trackpad energy level threshold, initiate the power state transition in the computing device.

11. The computing device of claim 10, wherein the instructions are executable to, at least on condition that the trackpad energy level of the trackpad identification signal meets or exceeds the trackpad energy level threshold, transition the computing device from an active power state to a reduced power state.

12. The computing device of claim 10, wherein the instructions are executable to, at least on condition that the trackpad energy level of the trackpad identification signal is below the trackpad energy level threshold, transition the computing device from a reduced power state to an active power state.

13. The computing device of claim 9, wherein prior to receiving the trackpad identification signal at the touch screen display and receiving the touch screen identification signal at the trackpad, the instructions are executable to:
receive from the touch screen display a trackpad touch detection signal transmitted by the trackpad;
receive from the trackpad a touch screen touch detection signal transmitted by the touch screen display;
compare the trackpad touch detection signal to a trackpad touch detection key and the touch screen touch detection signal to a touch screen touch detection key; and
on condition that the trackpad touch detection signal matches the trackpad touch detection key and the touch screen touch detection signal matches the touch screen touch detection key, cause the trackpad to transmit the trackpad identification signal and the touch screen display to transmit the touch screen identification signal.

14. The computing device of claim 13, wherein the instructions are executable to:
utilize the trackpad touch detection signal to perform touch detection at the trackpad; and
utilize the touch screen touch detection signal to perform touch detection at the touch screen display.

15. The computing device of claim 14, wherein the instructions are executable to:
cause the trackpad to transmit the touch screen identification signal during an identification timeslot;
cause the touch screen display to transmit the trackpad identification signal during the identification timeslot; and synchronize transmission of the trackpad identification signal and the touch screen identification signal to avoid overlap between the identification timeslot and a touch detection timeslot during which the trackpad touch detection signal and the touch screen touch detection signal are transmitted.

16. The computing device of claim 9, wherein the processor receives the trackpad identification signal and the touch screen identification signal via a physical layer.

17. In a computing device comprising a processor and a trackpad on a first substrate rotatably coupled to a second substrate comprising a touch screen display, a method for determining closing of the touch screen display relative to the trackpad, the method comprising:
receiving at the trackpad a touch screen identification signal that is transmitted by the touch screen display, wherein the touch screen identification signal is generated by driving electrodes of the touch screen display;
receiving at the touch screen display a trackpad identification signal that is transmitted by the trackpad, wherein the trackpad identification signal is generated by driving electrodes of the trackpad;
comparing at the processor the touch screen identification signal to a touch screen identification key and the trackpad identification signal to a trackpad identification key;
determining at the processor that the touch screen identification signal matches the touch screen identification key and the trackpad identification signal matches the trackpad identification key; and
at least on condition that the touch screen identification signal matches the touch screen identification key and the trackpad identification signal matches the trackpad identification key, transitioning the computing device from an active power state to a reduced power state.

18. The method of claim 17, further comprising:
comparing at the processor a touch screen energy level of the touch screen identification signal to a touch screen energy level threshold; and
based at least in part on the comparison of the touch screen energy level of the touch screen identification signal to the touch screen energy level threshold, transitioning the computing device from the active power state to the reduced power state.

19. The method of claim 17, further comprising, prior to receiving the touch screen identification signal at the trackpad and receiving the trackpad identification signal at the touch screen display:
receiving at the trackpad a touch screen touch detection signal that is transmitted by the touch screen display;
receiving at the touch screen display a trackpad touch detection signal that is transmitted by the trackpad;
sending the touch screen touch detection signal and the trackpad touch detection signal to the processor;
comparing at the processor the touch screen touch detection signal to a touch screen touch detection key and the trackpad touch detection signal to a trackpad touch detection key; and
on condition that the touch screen touch detection signal matches the touch screen touch detection key and the trackpad touch detection signal matches the trackpad touch detection key, causing the trackpad to transmit the trackpad identification signal and the touch screen to transmit the touch screen identification signal.

20. The method of claim 19, wherein the trackpad touch detection signal is also utilized by the computing device to perform touch detection at the trackpad and the touch screen touch detection signal is also utilized by computing device to perform touch detection at the touch screen display.

* * * * *